United States Patent [19]

Takahashi et al.

[11] Patent Number: 5,966,473

[45] Date of Patent: Oct. 12, 1999

[54] METHOD AND APPARATUS FOR RECOGNIZING A QUADRILATERAL OBJECT CONTAINED IN AN INPUT BITMAP IMAGE

[75] Inventors: Hiroyasu Takahashi, Yokohama; Toshimichi Arima, Fujisawa, both of Japan

[73] Assignee: International Business Machines Corporation, Armonk, N.Y.

[21] Appl. No.: 08/949,464

[22] Filed: Oct. 14, 1997

[30] Foreign Application Priority Data

Nov. 28, 1996 [JP] Japan .................................. 8-317242

[51] Int. Cl.$^6$ .................................................. E05C 19/18
[52] U.S. Cl. ........................... 382/292; 382/170; 382/175; 382/177; 382/184; 382/203; 382/293; 382/295; 345/144; 345/441; 345/468; 345/469
[58] Field of Search ...................................... 382/292, 289, 382/173, 175, 177, 180, 184, 168, 170, 203, 293, 295; 250/208.1; 345/441, 469, 144, 468

[56] References Cited

U.S. PATENT DOCUMENTS

| | | | |
|---|---|---|---|
| 5,065,442 | 11/1991 | Kugai | 382/48 |
| 5,563,403 | 10/1996 | Bessho et al. | 250/208.1 |
| 5,563,964 | 10/1996 | Tanaka et al. | 382/292 |
| 5,572,602 | 11/1996 | Naoi et al. | 382/178 |
| 5,719,629 | 2/1998 | Chun | 348/413 |
| 5,724,073 | 3/1998 | Hino et al. | 345/441 |

*Primary Examiner*—Jose L. Couso
*Assistant Examiner*—Kanji Patel
*Attorney, Agent, or Firm*—Anthony N. Magistrale

[57] ABSTRACT

Described is an image processing system which is operative to automatically determine a quadrilateral object such as a character frame, page mark, or position correction mark only with a mouse click. A field is automatically specified by displaying a scanned image of a form including a black frame on a display, clicking within a character frame at the left end for each recognition field, and clicking within a character frame at the right end of the same field. In this case, a field position/size determination program scans the image in the vertical and horizontal directions from the two clicked points to detect the inner wall of the black frame, and produces a histogram by establishing rectangles between two character frames to automatically detect the number of character frames in the field and the thickness of the black line between the character frames. In addition, for a form with a page mark or position correction mark, what is the mark can be automatically detected from the surrounding is black, and the height of the mark only by clicking the inside of the mark with a mouse.

6 Claims, 8 Drawing Sheets

METHOD AND APPARATUS FOR RECOGNIZING A QUADRILATERAL OBJECT CONTAINED IN AN INPUT BITMAP IMAGE

FIELD OF THE INVENTION

The present invention relates to an image processing method and apparatus, and, more particularly, to a method and apparatus for detecting position information of frames contained in an Optical Character Reader (OCR) form of an input bitmap image based on position information input by an operator.

BACKGROUND ART

In defining an OCR form for having a character recognition program recognize a new formatted OCR form, it should be conventionally required to measure the size of the form, the relative positions and sizes of page marks, position correction marks (also called a timing or reference mark), character fields, characters with a scale and to input their values. However, the definition of OCR forms is troublesome for programmers. For example, it takes an enormous amount of time to design new dropout OCR forms (a form specially prepared for OCR, and printed with characters and character frames in colors that are not sensed by scanners).

To solve such problems, several conventional techniques have been proposed. As an example, "WinReader Hand, v. 1.5, Users' Manual, Setting of Fields," pp. 19 and 20, Media Drive Co. ("WinReader Hand" is a trademark of Media Drive Co.) describes an approach in which the image of an unfilled form with black frames is captured by a scanner and displayed on a display. All black vertical and horizontal lines are automatically detected and character recognition fields are set after the operator confirms that all rectilinear lines are properly detected.

The above approach requires less tasks by the programmer than the approach using a scale and has much simpler field definitions. The conventional character recognition program described above detects all rectilinear lines to specify fields to which attributes are set and then defines the position and size of the fields to be set with the attributes by using one of the following approaches:

1. Click inside of a ladder frame subject to setting (inside of any one of a plurality of character frames). In this case, all continuing character frames are defined and a part of the ladder frame cannot be defined as a field.
2. Click the upper left corner of the ladder frame subject to setting (a ladder like object consisting of a plurality of continuing character frames) with a mouse, drag it to the lower right corner and release the mouse button. In this case also, all continuing character frames are defined as a field and a part of the ladder frame cannot be defined.
3. Click inside any one character frame contained in a ladder frame subject to setting with the mouse, drag it to the inside of another character frame contained in the ladder frame and release the mouse button. This operation can define a part of the ladder frame as a field.

Even in this rectilinear line detection itself, if the scanned form is inclined (skewed), the black frame line is thin or the frame line becomes blurred due to the sensitivity of scanners or noise. As a result, all black rectilinear lines may not be properly detected. In such a case, there is a disadvantage that scanning must be performed again by carefully overwriting the lines with thin printing with a pencil or pen which can be sensed by the scanner, adjusting sensitivity of the scanners, or carefully setting the form so that no skew occurs. In addition, since the detection of black rectilinear lines is a prerequisite, when it is intended to apply this program to the frame of a dropout form printed in color which is not sensed by the OCR scanner, there also arises a disadvantage in that all frames to be detected must be overwritten with a pen or pencil to be captured by the scanner.

The field definition method in the conventional character recognition program separately performs the field definitions and the detection of rectilinear lines. Since all black vertical and horizontal lines presented in the form image captured by the scanner are automatically detected whether or not each graphic (object) is required to be detected, unnecessary graphics detection processing is performed which decreases processing speed. In addition, in the automatic detection, it is impossible to distinguish objects other than the character frames such as page marks and position correction marks from the character frames.

In addition, in the above-mentioned second method, when a small display is used or when setting is performed for a small character frame, since dragging is not an easy operation for everyone, there is a possibility that an entire character frame intended to be set cannot be included in a rectangle formed by point-and-drag by the operator, or that another character frame will be included. Thus, some skill may be necessary for the operation of the pointer. Therefore, an approach is needed in which the operator can more easily specify fields and perform the operation more quickly.

On the other hand, the conventional character recognition programs use information of attributes of character fields for recognition accuracy up and some other objects. The information on the field attributes include information in determining whether an image-cut only is acquired or recognition is executed, or those on character type. Here, "an image-cut only" means a field only for acquiring an image without character recognition. On the other hand, "execution of recognition" means a field to which character recognition is actually applied. In addition, the "character type" includes information on selection of "hand writing" or "print," on selection of "upper case" or "lower case," or setting of a "symbol," "numeral," "katakana," "hiragana," "alphabet," or "kanji."

Since setting of the field attributes prevents "0" in a numeric entry from being erroneously recognized as "O" of an alphabetic entry, and the number of sets to be compared is reduced, there is an advantage that recognition can be attained at a high speed. Since there are characters which are difficult to distinguish such as the numeral "0" and the letter "O" particularly in the recognition of hand written characters, this information is essential and it is necessary to perform the above definition for each type of form. If a definition of such attributes and detection of rectilinear lines can be attained in a series of operations, the operator can smoothly and quickly define the form.

Other techniques relating to the present invention include Published Unexamined Japanese Patent Application (PUPA) Nos. 7-160811, 7-225809, and 7-57049. However, PUPA No. 7-160811 relates to a technique in which modification is performed by selecting a region of displayed binary image information with a pointing device and expanding or reducing the region. PUPA No. 7-225809 relates to a technique in which a frame to be read is generated by indicating one point at the upper left corner with indicating means. PUPA No. 7-57049 relates to a technique in which the order for reading regions such as character, table and photo regions is changed by using a mouse or the like. Therefore, they cannot recognize position information of parts of quadrilateral frames contained in an input bitmap image quickly and in a high speed.

An object of the present invention is to provide an image processing system with a simple user interface and capable of operating at a high speed. In addition, according to one aspect of the present invention, it is intended to provide a character recognition processing system which can accommodate slight skew, improper setting of density (sensitivity) of a scanner, or blur of lines forming the frame due to noise in defining a form for OCR. Furthermore, according to another aspect of the present invention, it is intended to provide a character recognition processing system which can easily and semi-automatically define a page mark or a position correction mark and can easily define a dropout form.

SUMMARY OF THE INVENTION

One embodiment of the present invention is directed to a method for recognizing position information of a quadrilateral object contained in an input bitmap and includes the step of recognizing a first input point in the bitmap image is identified. Next, position information of a first point and a second point is derived by searching the first and second points corresponding to a first pixel and a second pixel, respectively, the first and second pixels being pixels existing on a rectilinear line passing through near the first input point in a first direction, and having specific values, and existing in directions symmetric to the first input point, respectively. The method further includes deriving position information of a third point and a fourth point by searching the third and fourth points corresponding to a third pixel and a fourth pixel, respectively, the third and fourth pixels being pixels existing on a rectilinear line passing through near the first input point in a second direction substantially perpendicular to the first direction, and having specific values, and existing in directions symmetric to the first input point, respectively. Lastly, position information of the quadrilateral object is derived from the position information of the first, second, third and fourth points.

Another embodiment of the present invention is directed to an apparatus for recognizing position information of a quadrilateral object contained in a bitmap form image input from a scanner based on position information input from a pointing device. The apparatus includes an image input section for holding a bitmap form image, an image display section for displaying the bitmap form image on the display screen and an input section for recognizing a first input point on the quadrilateral object is identified. An image analyzer is included for deriving position information of a first point and a second point by searching the first and second points corresponding to a first pixel and a second pixel, respectively, the first and second pixels being pixels existing on a rectilinear line passing through near the first input point in a first direction, and having specific values, and existing in directions symmetric to the first input point, respectively. The image analyzer is also used for deriving position information of a third point and a fourth point by searching the third and fourth points corresponding to a third pixel and a fourth pixel, respectively, the third and fourth pixels being pixels existing on a rectilinear line passing through near the first input point in a second direction substantially perpendicular to the first direction, and having specific values, and existing in directions symmetric to the first input point, respectively. Lastly, the image analyzer is used to derive position information of the quadrilateral object from the position information of the first, second, third and fourth points.

DETAILED DESCRIPTION OF THE INVENTION

Figure 1:
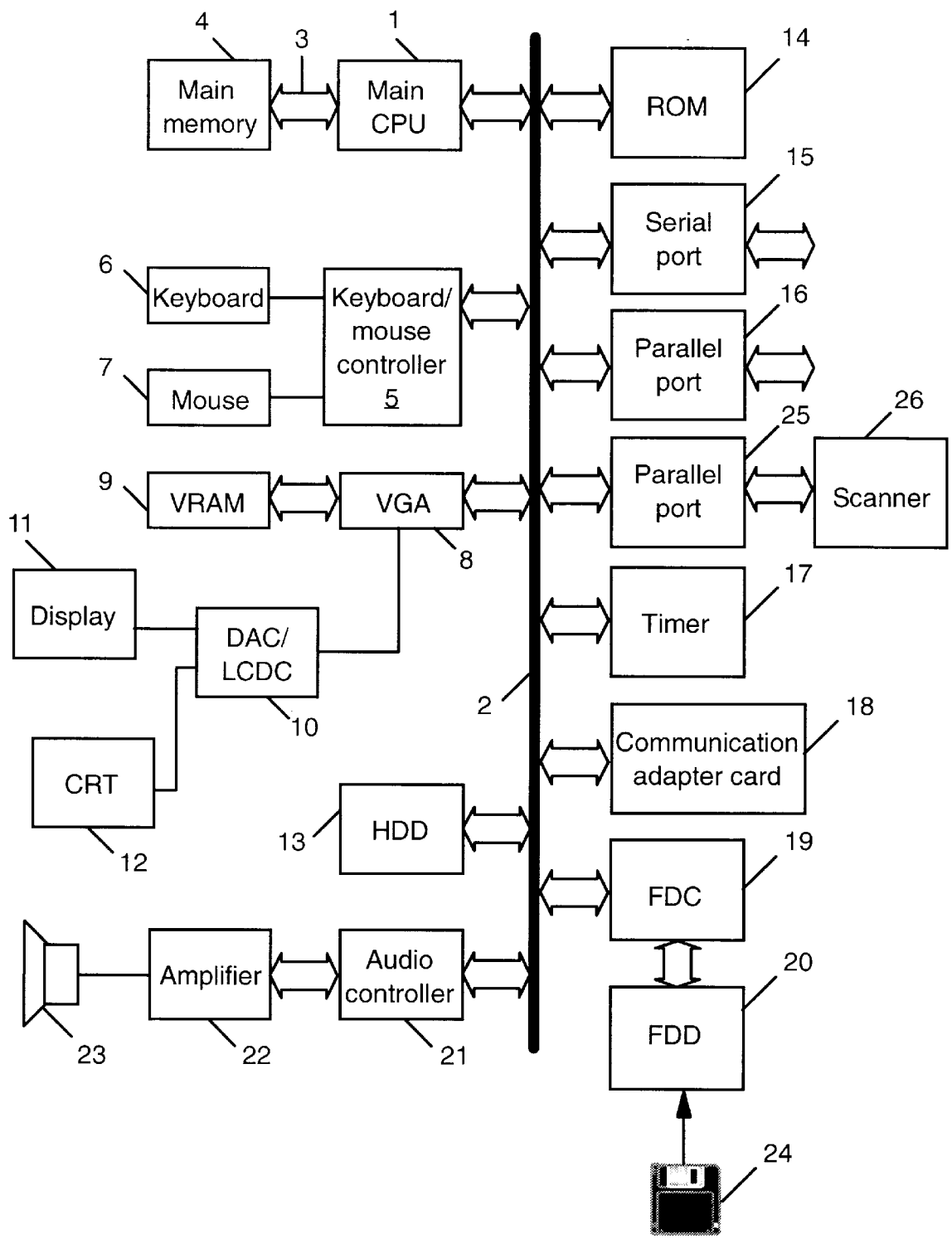
FIG. 1 is a block diagram of an image processing system in accordance with the present invention.

Referring to FIG. 1, there is shown a schematic diagram of a hardware configuration for implementing an image processing system in accordance with the present invention. The image processing system 100 includes a central processing unit (CPU) 1 and a memory 4. The CPU 1 and the memory 4 are connected to a hard disk drive 13 as an auxiliary device through a bus 2. A floppy disk drive (or, a drive for a medium such as an MO or a CD-ROM) 20 is connected to the bus 2 through a floppy disk controller 19.

A floppy disk 24 (or, a medium such as an MO or CD-ROM) is inserted into the floppy disk drive (or, a drive for a medium such as an MO or a CD-ROM) 20. It is possible to record in the floppy disk, the hard disk drive 13 or a ROM 14 codes of a program for providing instructions to a CPU or the like in cooperation with an operating system and for implementing the present invention. These codes are loaded in the memory 4 for execution. The computer program codes may be compressed or divided into a plurality of segments for storage in a plurality of media.

The image processing system 100 may be a system with user interface hardware. The user interface hardware may include, for example, a pointing device such as a mouse, joystick or track ball 7 for inputting screen position information, a keyboard 6 and a display 12 for presenting image data to a user. In addition, a speaker 23 receives audio signals from an audio controller 21 through an amplifier 22 and outputs it as sound.

Image data which is input to the image processing system 100 of the present invention is preferably produced by a scanner 26 and input into the image system 100 through a parallel port 25. However, the image data produced by the scanner 26 may be input into the image processing system 100 through a small computer system interface (SCSI) or other interface instead of the parallel port 25. In addition, the image data may be received from another computer by communication with it through a serial port 15 and a modem, Token Link or a communication adapter 18, or input from other input means such as a floppy disk drive.

Thus, the present invention can be easily understood to be implemented by a usual personal computer (PC) or workstation or an OCR, or combination thereof. However, such components are mere examples, and all such components are not necessarily essential for the present invention. Particularly, since the present invention is for visually supporting the operator, components such as the serial port 15, communication adapter card 18, audio controller 21, amplifier 22 of speaker 23 are not essential.

The present invention is also not limited to a specific operating system environment but can be, for example, one that supports a GUI multi-window environment such as Windows (trademark of Microsoft), OS/2 (trademark of IBM), or X-Window (trademarks of MIT) system on AIX (trademark of IBM).

In addition, while FIG. 1 shows a system in a standalone environment, the present invention may be implemented as a client-server system in which a client machine is LAN attached to a server machine through an Ethernet or Token Link. Only a user input section, an image display section and an image input section described later need be provided on the client machine, and all other components may be provided on the server machine. Thus, which functions are provided on the server machine and the client server is a matter which can be freely modified in design and various modifications such as machine combinations, what functionality is distributed to them and how they are implemented, are included in the spirit of the present invention.

Now, the system configuration of the present invention will be described with reference to the block diagram of FIG. 2. The image processing system 100 includes a user input section 101, a control section 103, an image analyzer 105, an image display section 107, an attribute information input control section 109, an image input section 111 and a field position/attribute information storage section 113.

The user input section 101 has functions for inputting instructions to start or stop processing, inputting coordinate values on the screen using the pointing device and receiving input of attribute information and transmitting it to the control section 103. The image input section 111 holds image information of a form input from a scanner or the like, and transmits it to the control section 103. The image analyzer 105 analyzes the image information held in the image input section 111, derives coordinate values or the like and returns it to the control section 103. The image display section 107 displays the image information of the form held in the image input section, field position information stored in the field position/attribute information storage section 113 and attribute information on the display screen. The attribute information control section 109 performs conversion and processing for displaying the attribute information stored in the field position/attribute storage section 113.

Figure 2:
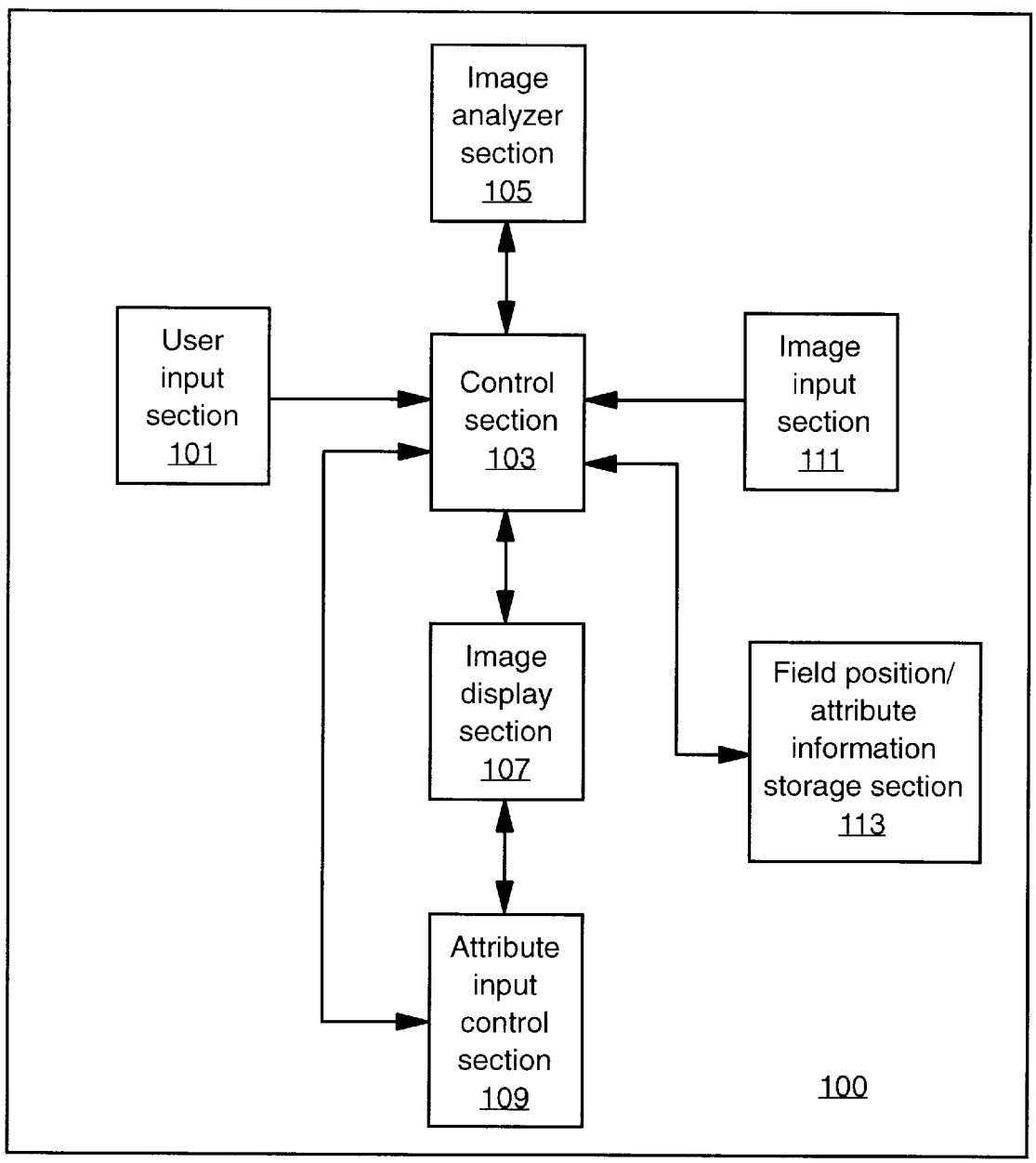
FIG. 2 is a block diagram of a system configuration of the image processing system of FIG. 1.

The function blocks shown in FIG. 2 are logical function blocks and are not meant to be implemented in a set of individual hardware or software, but may be implemented as composite or common hardware or software.

Figure 3:
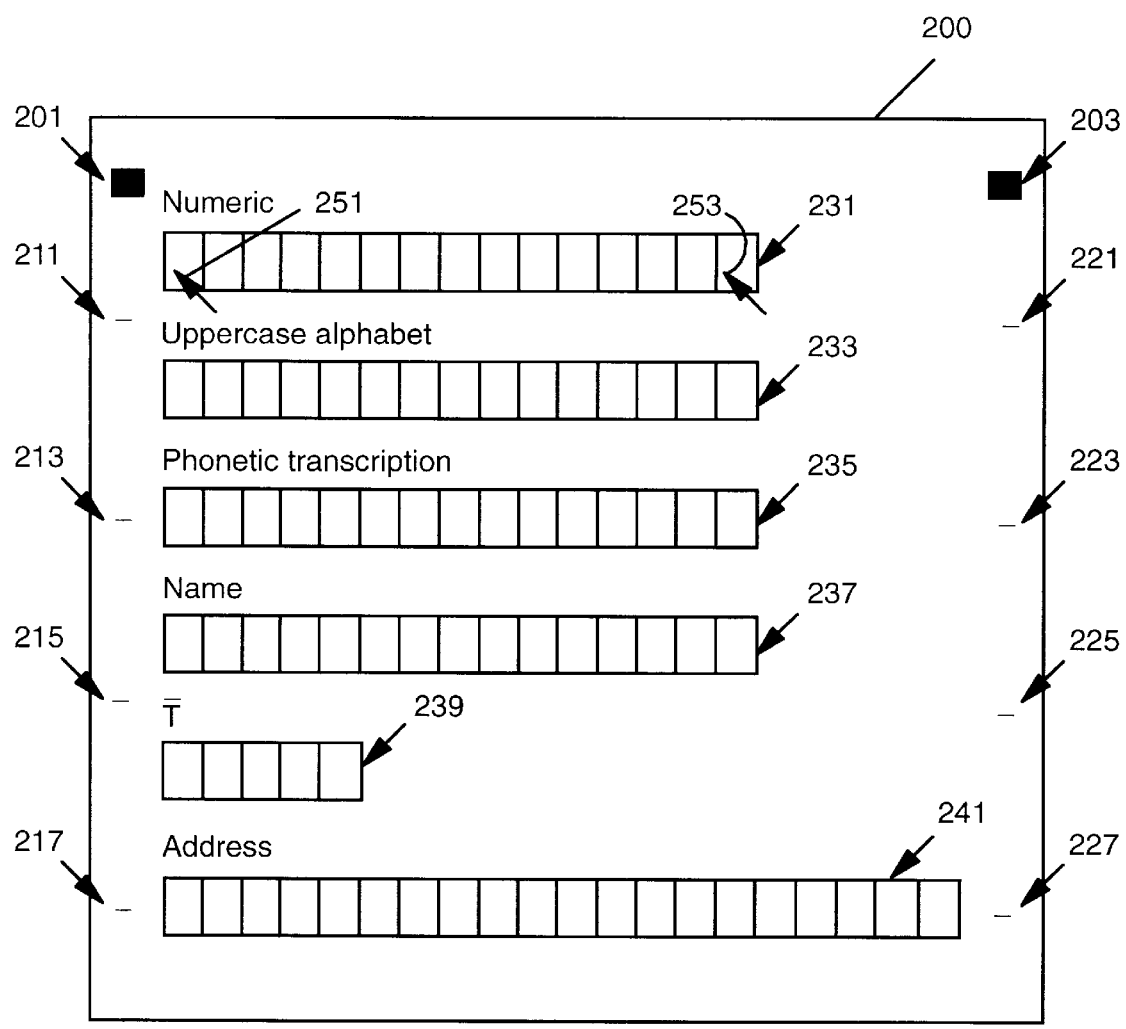
FIG. 3 is an image of a form input by the scanner in the system of FIG. 1.
Figure 4:
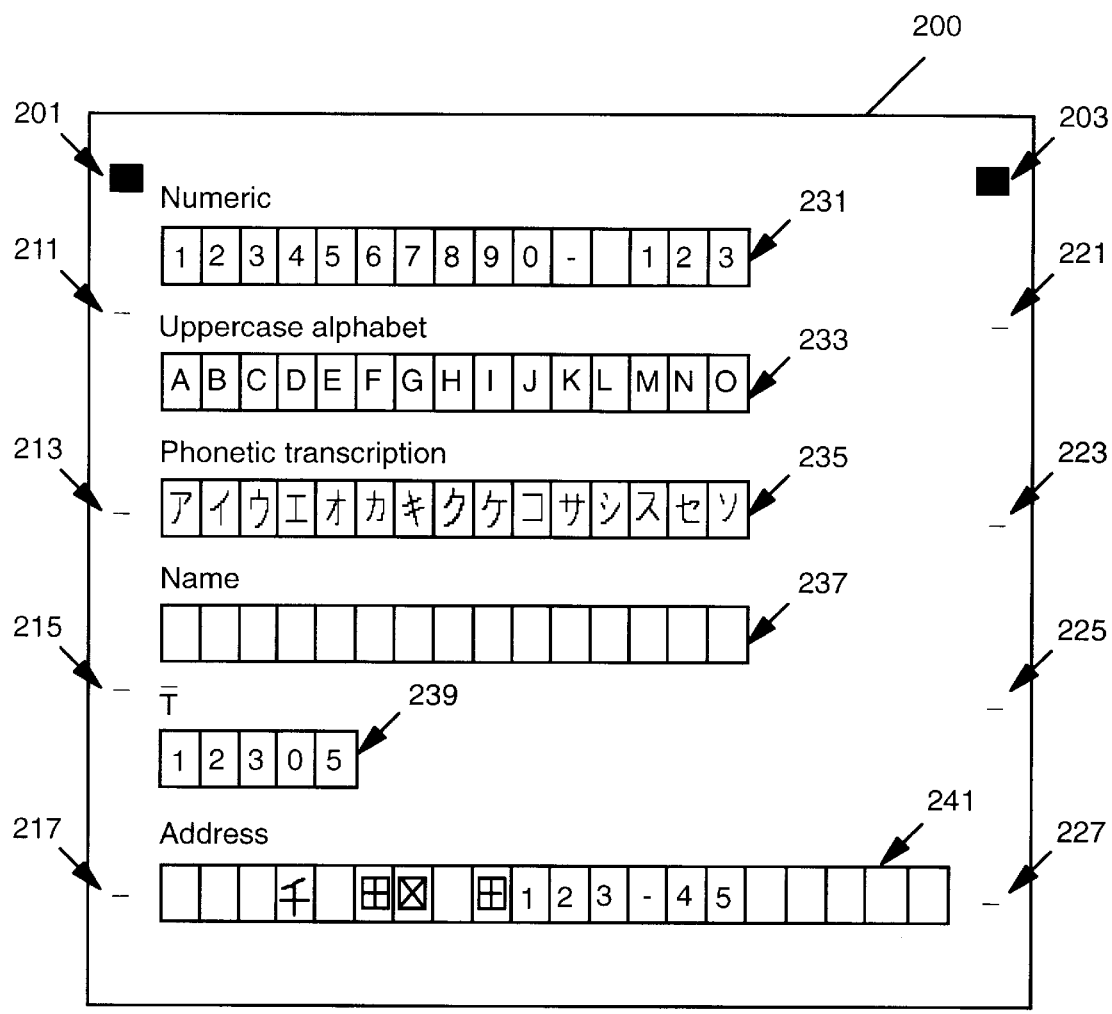
FIG. 4 is the image of the form of FIG. 3 when the fields are filled in with input data.

FIG. 3 is image data of the form input from the scanner 26. The input image data is temporarily held in the image input section 111 and sent to the image display section 107 through the control section 103. The image display section 107 displays this data on the display 11 as an image. The image information displayed on the display 11 is displayed in a form to be manipulated by the operator. The image data is used in the design stage to determine with what attribute characters or symbols are input at what position and in what type, and recognized by what method when a form with actually filled-in fields as shown in FIG. 4 is input.

Figure 5:
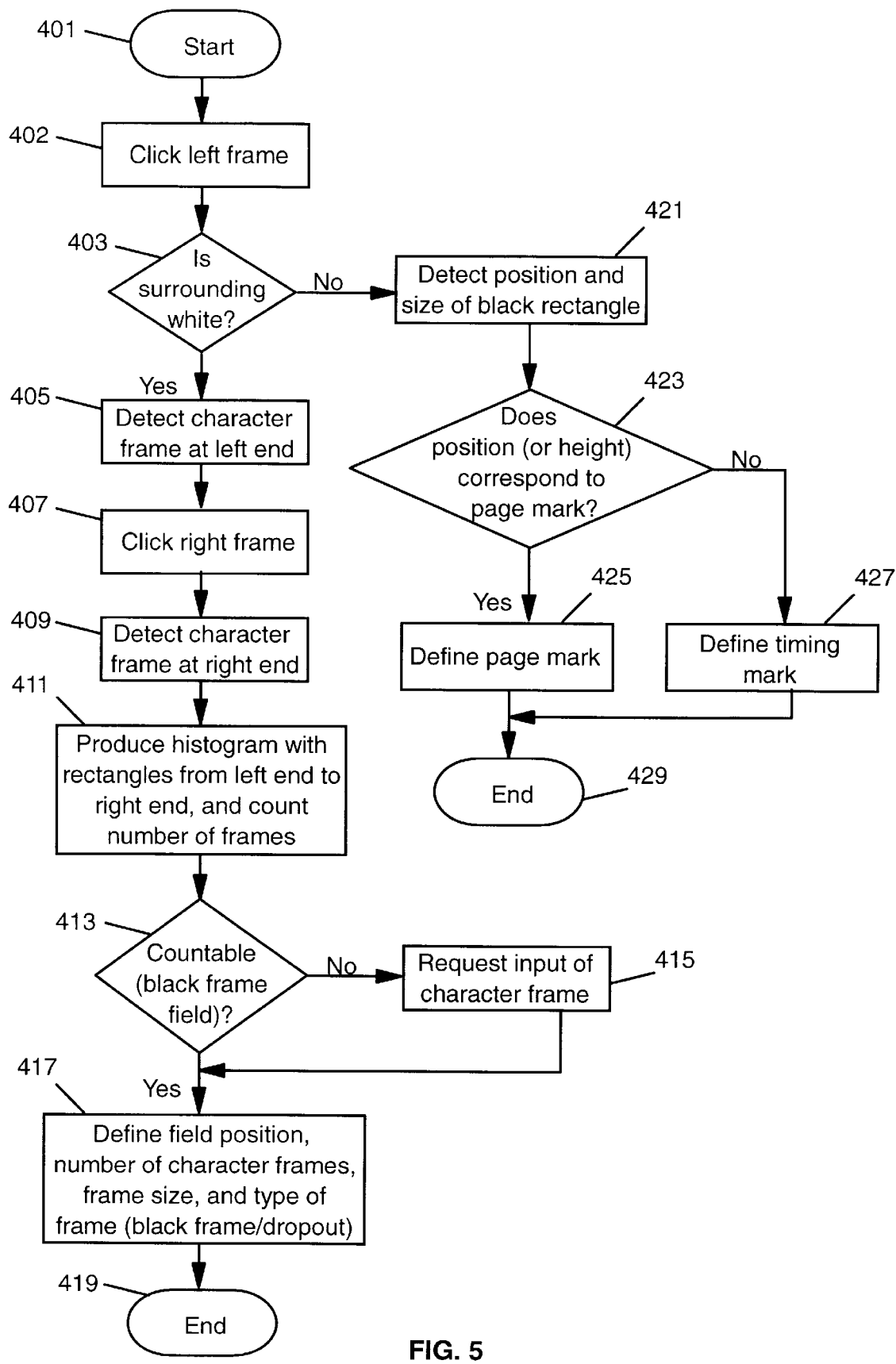
FIG. 5 is a flow chart showing a process according to the present invention.

FIG. 5 is a flowchart illustrating processing steps in the present invention. The processing begins with block 401. In this state, the image data of the form input from the scanner 26 is displayed on the display 11. The image processing system 100 of the present invention waits until it detects input by the operator.

The operator inputs position information in the image processing system by the pointing device to direct a position on the display screen of the display 11. The operator inputs the position information by clicking the left button of the mouse 7. The input of the position information with the mouse 7 may be replaced by other pointing devices such as a track ball, touch panel, stylus pen, or joystick. In addition, clicking with the left button may be alternatively performed by those generating an event recognizable to the system such as the right button click, or double click.

When the image processing system 100 detects the position information by the user, it validates values of pixels of the image data held by the image input section 111 and at a position corresponding to the input position information, and values of pixels at a neighboring position (block 403). The image data input from the scanner and held in the image input section 111 is in a form of binary bitmap in which a pixel value of 1 represents black and 0 represents white. However, the present invention is not limited to the technology for processing only binary image data, but may be applied to, for example, a bitmap image of color data in which each pixel consists of a plurality of bits. In such a case, it may be possible that, if the pixel value indicates a value in a predetermined range, it is determined to be a pixel constituting a frame or page mark, otherwise, it is determined to be a pixel not constituting the frame or page mark, but constituting the "background" region.

The reason why not only the pixel corresponding to the coordinate value input by the operator but also the values of pixels positioned near it are important is that there may be noise in the input image data shown in FIG. 3. The noise may be attributed to various causes such as dust attached in inputting with the scanner. Thus, the possibility of erroneous recognition is reduced by validating not only the pixel corresponding to the coordinate value input by the operator but also pixels near it (for example, eight pixels around the pixel corresponding to the coordinate value). In such a case, if seven or more out of nine pixels are "black," it can be determined that the operator clicks a "black" area, while, if seven or more are "white," it can be determined that a "white" area is clicked. In addition, it may be possible that, if both cases are not established, it is processed as an input error and the operator is again prompted for input. However, validating not only the input point but also pixels is not the essential condition in implementing the present invention. Although the possibility of erroneous recognition due to the influence of noise may be increased, the present invention can be implemented by validating at least one pixel of the input point or one positioned near it.

Figure 6:
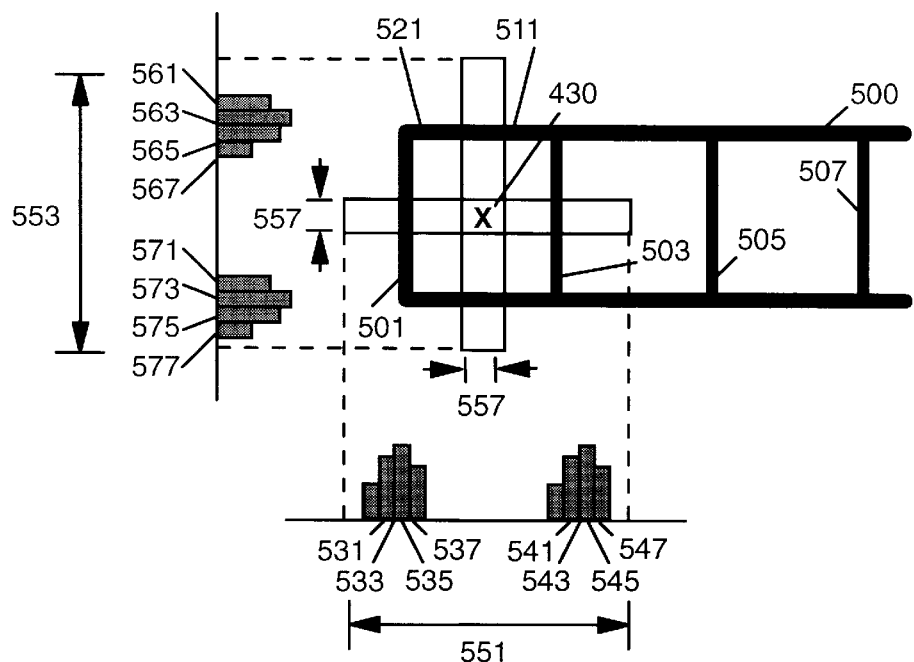
FIG. 6 is a diagram for illustrating the procedure for detecting a single character frame in accordance with the present invention.

When it is determined in block 403 that "white" is clicked, the image processing apparatus 100 determines that a character frame at the left end is clicked and detects the character frame at the left end in block 405. FIG. 6 is a detailed illustration of the detection of the character frame at the left end. Vertical and horizontal scanning is performed to detect a point encountering black and changing to white with a thin rectangular histogram by using as the reference the point corresponding to the coordinate values detected in block 402 (if resolution which can be input by the scanner differs from the image data held in the image input section, the pixel closest to the coordinate values input by the pointing device is selected to be the corresponding point).

When an OCR currently available in the market is taken as an example, the size of the character frame 500 is rated as be designed to be 3.9 mm–9.0 mm wide, 5.0 mm–9.0 mm high, 0.4 mm–0.8 mm line width. The size of the longer side of the rectangle for the histogram is preferably set to be slightly larger than a length of 19.6 mm (two times a value of the maximum width or maximum height of 9.0 mm plus the maximum line width of 0.8) for both lateral and longitudinal rectangles.

If the width of the rectangle for the histogram (shorter side) is too wide, there is a possibility that a pixel constituting the frame will be included in the rectangle. On the other hand, if it is too narrow, there is a possibility that the effect of noise has become relatively noticeable. Thus, in the present invention, the width of the rectangle for the histogram is set to be about 1–2 mm.

In the present invention, the histogram is produced by vertically and horizontally scanning a rectangle around a clicked point (first input point). Referring to a lateral histogram 551, there are areas 535 and 545 where "black" is detected in the entire lateral direction of the rectangle; areas 533 and 543 where a part of "black" is determined to be "white" due to noise; and areas 531, 537, 541 and 547 where it is uncertain whether it is "white" or "black" because it is on the boundary between "white" and "black." Such noise depends on the form of skew, performance of the scanner, or erroneous setting of density in addition to the abovementioned dust. In the present invention, a threshold is established to eliminate such noise in such a manner that, for example, if 90% of the width of the rectangle is detected as "black," they are pixels constituting a character frame.

Such scanning enables it to obtain x and y coordinates for each side of inner and outer quadrilateral of a character frame, and to obtain position information of two quadrilateral objects constituting the character frame (quadrilaterals constituting the inside and outside of the character frame, respectively). These coordinate values may be those corresponding to points where white (or black) changes to black (white), or coordinate values corresponding to points corresponding to white (or black) points remotest from the input point when white (or black) changes to black (or white). In the present invention, the quadrilateral object is defined by calculating the width of the quadrilateral object from two x coordinate values obtained by horizontally scanning the inner quadrilateral object (x coordinates: x 535 and x 543 detected from the reference numerals 535 and 543 of FIG. 6), the height of the quadrilateral object from two y coordinate values obtained by vertical scanning (y coordinate values: y 565 and y 573 detected from the reference numerals 565 and 573 in FIG. 6), and the start point 521 defining the quadrilateral object from x 535 and y 565, and holding these values. The outer quadrilateral object is defined by holding the thickness of the frame.

However, there are various methods for defining the quadrilateral object. For example, the quadrilateral object may be defined by any one of four vortexes of the quadrilateral as the starting point, by either one of the height or width and x or y coordinates of two vortexes, or by holding coordinate values of two vortexes on a diagonal line. All of them are included in the spirit of the present invention. In addition, the unit of coordinate values may not only be millimeters but also a unit such as number of dots in the input bitmap image.

In detecting the character frame, if the size of the character frame is too small, there is a possibility that pixels of an adjacent character frame will be captured. In such a case, it may be possible to determine the closest point to the clicked point. If the width or height of the character frame is detected at a value lower than the threshold, it may be possible to perform scanning again by shifting the input point to any point determined to be "white," to eliminate a character frame with a thickness less than the threshold, or to determine as an input error and prompt the operator for input again.

In addition, the method for scanning the predetermined width is to eliminate the effect of noise by setting the threshold slightly smaller than the narrower width of the rectangle (about 80–90%). The present invention may be implemented by scanning pixels on a rectilinear line although there is a possibility to be affected by noise.

Figure 7:
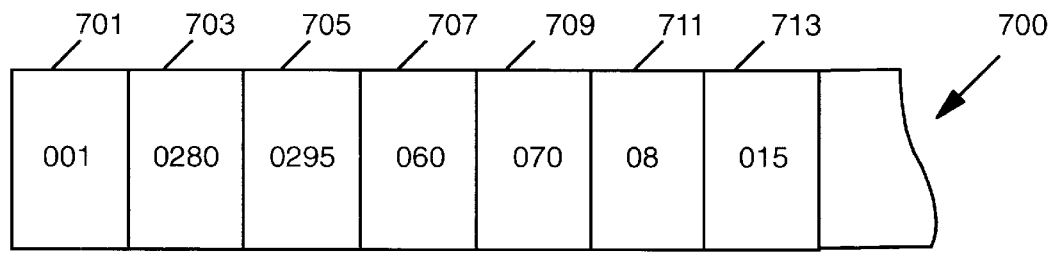
FIG. 7 is a diagram of field position information stored in the field position/attribute information storage section 113 in accordance with the present invention.

The definition information of the character frame is returned back from the image analyzer 105 to the control section 103 and stored in the field position/attribute information storage section 113. In the present invention, the storing is executed as the termination processing in block 419. FIG. 7 is an embodiment of the field position information stored in the field position/attribute information storage section 113. A serial number 701 contained in the illustrated field position record 700 is automatically assigned by the control section 103 in the order specified by the operator. In this example, the x coordinate of start point 703, the y coordinate of start point 705, the width 707, the height 709, and the thickness of frame 711 are stored in 0.1 mm units. In a system where the size of the quadrilateral is always constant, the width 707, the height 709, and the thickness of frame 711 are not required to be specifically controlled.

Referring to FIG. 5 again, after the detection of the character frame at the left end is completed (block 405), the system waits for clicking on a frame at the right end for a field which the operator wishes to define (block 407). If the next clicked point is within an area of the character frame at the left end, it is determined that the number of the character frame is one, and 001 is stored in the area of the character frame number 713 with the field position information record 700 shown in FIG. 7.

If the clicked point is not within the area of the character frame at the left end, the character frame at the right end is detected by performing scanning similar to that for the character frame at the left end (block 409). However, if the right and left character frames are substantially identical after the character frame at the right end is detected, they may be considered to be one character frame. However, the process for detecting the character frame at the right end is a process necessary to detect skew of the form image, and to recognize a plurality of character frames existing not only in the horizontal direction but also in the vertical direction as one field by defining them once. If this process is omitted, the y coordinate is processed as if it was the same as the character frame at the left end. In addition, for the x coordinate, information on the number of frames can be obtained by detecting it with a histogram from the first input point (a point in the character frame at the left end clicked by the operator) and the second input point (a point in the character frame at the right end clicked by the operator), by detecting a frame in the right simply scanning the character frame at the right end from the second input point, or by having the operator count the number of frames and prompting him/her for input.

Since, when the scanned form is determined to be skewed, the angle of skew can be calculated from the x and y coordinates of the frame at the left end and the x and y coordinates of the frame at the right end, definition can be registered by correcting each field so that it is considered to be constituted by complete horizontal and vertical lines. In performing recognition, the field is identified by matching the actually detected horizontal line (substantially horizontal line) with an ideal horizontal line.

Figure 8:
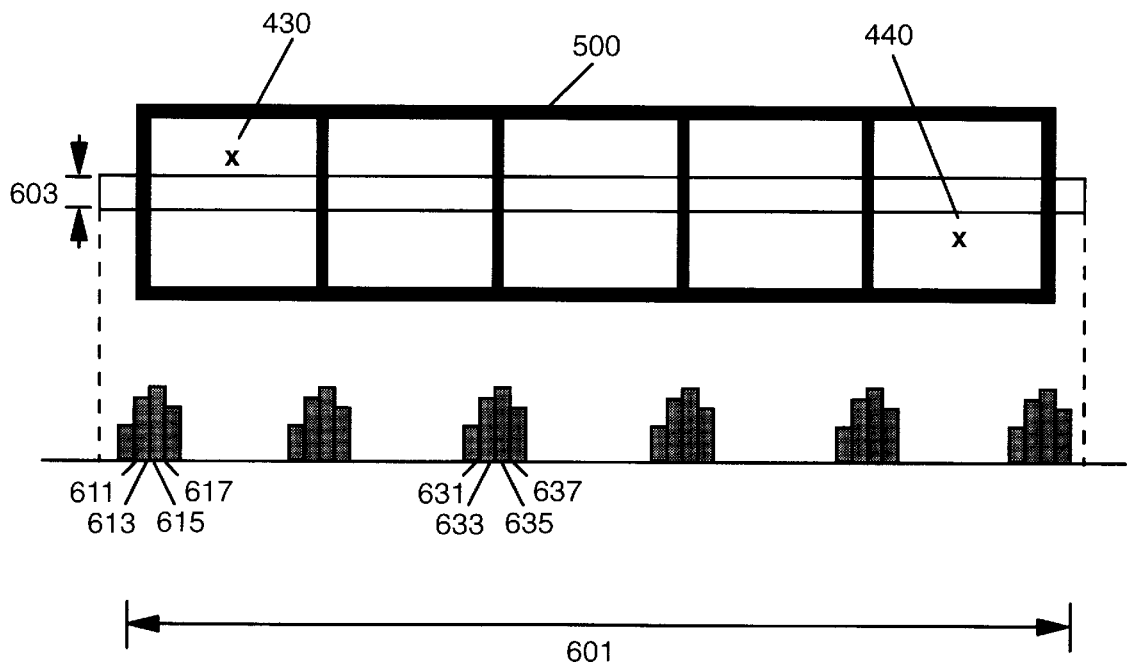
FIG. 8 is a diagram for illustrating the procedure for performing a scan over a plurality of character frames in accordance with the present invention.

FIG. 8 is for illustrating the process for performing scans between the character frames at the left and right ends to detect the number of the character frames. In FIG. 8, a rectangle is established to be slightly larger than the longer side of the outer frame of the field and smaller than the shorter side to be placed horizontally inside of the outer frame. Creation and evaluation of a histogram are performed in the same manner as in the process described for the character frame at the left end. However, since the x coordinate of the character frame at the left end is already obtained, scanning may be performed from the left end so that it can detect the right frame of the second character frame and so on. In addition, since the value of the width of the character frame at the left end is already known, scanning on the right side of the second input point is sufficient to perform for a length corresponding to the width of the frame from the second input point. This enables the system to detect the number and width of separating lines between the character frames and to determine number of characters. The width of the character frame and the thickness of the frame thus derived may be averaged to correct the value derived from the character frame at the left end.

In the present invention, when even one character frame fails to meet the threshold range (being set to a width of 10% with reference to the width of the character frame at the left end) in the histogram over a plurality of character frames, it is determined to be an uncountable field (block 413). When such a determination is made, the image processing system 100 prompts the operator on the display screen to input the number of character frames and displays the entries for input (block 415).

This process is particularly convenient in defining a dropout form. In the case of a dropout form, the operator can define the position and size of the field in a similar manner by previously blacking out the character frames at the left and the right end of each field (only the right side may be satisfactory for the character frame at the right end). At the moment, if the operator inputs the number of character frames, the gap between character frames can be calculated even for a field with an individual character frame (a character field of a type in which each character frame is separated).

In the method for detecting a character frame by all black vertical and horizontal lines described in conjunction with the background art, all character frames to be recognized must be overwritten with a pen or pencil recognizable by the scanner. The present invention can overcome this disadvantage by significantly reducing the work to be performed by the operator.

With the processing as described above, all items indicated in FIG. 7 are obtained so that sufficient information can be obtained to identify the position and size of a field. Once the position and size information of the field is determined, the present invention changes the color of a character frame (for example, red or yellow) to indicate that the field is identified. Instead of a color change of the character frame, display of change of the field having the operator recognize that the frame is recognized may be performed by change of brightness, blinking of the frame, change of color within the character frame or overlaying of a colored frame.

Figure 10:
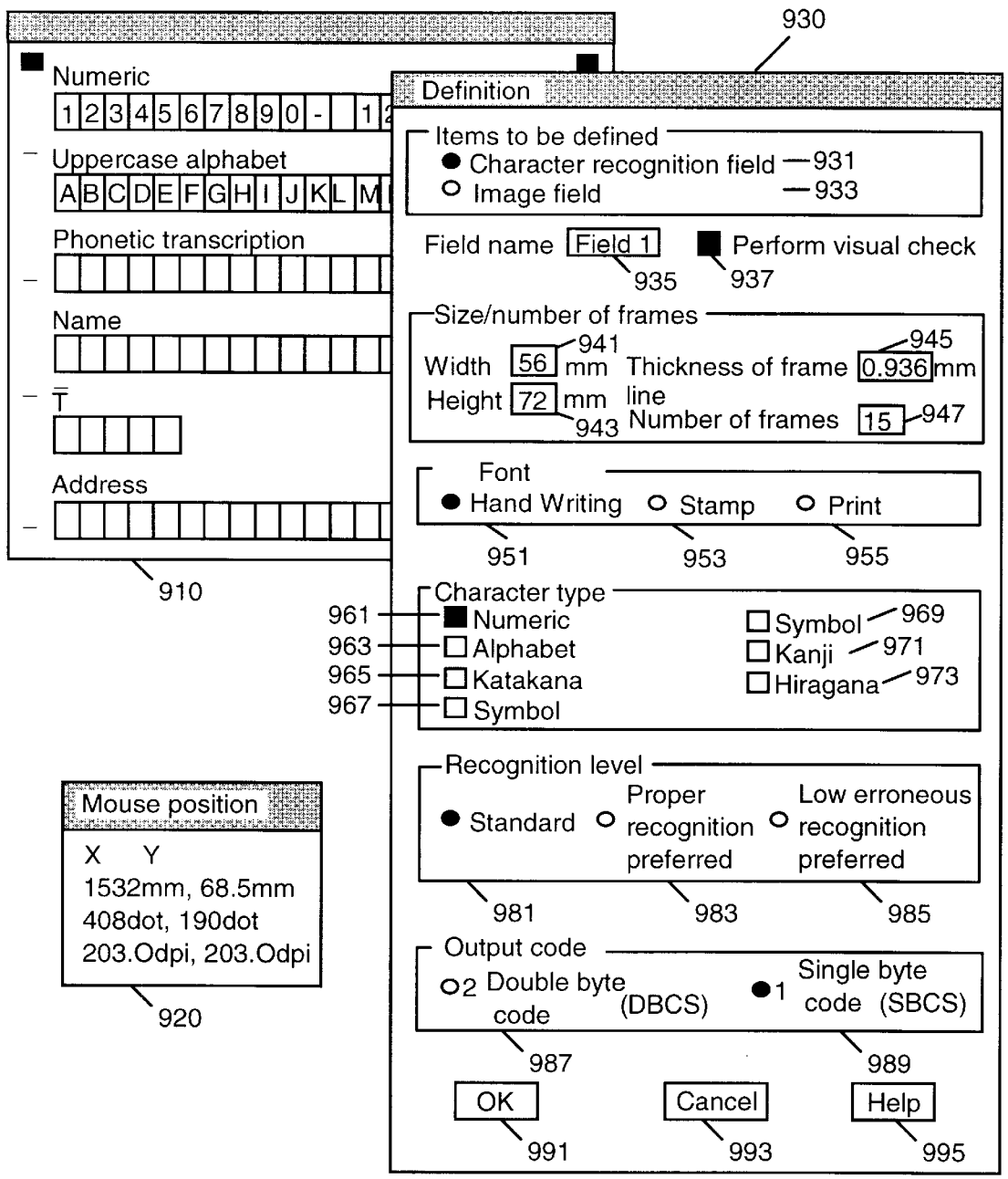
FIG. 10 is a diagram of a user interface according to the present invention.

Subsequently, the present invention displays an attribute input window 930 to be associated with the identified field as shown in FIG. 10. In FIG. 10, a numeric field positioned at the top of the form image in the window 910 is selected and displayed so that a blue frame is overlaid over the black frame.

Default values are set in the input entries 931 through 989, and the position and size to information derived by the above-described process is displayed in a position and size information 941–947. These values may be modified with user input, and the blue character frame may be adjusted with the modified input value and displayed in the window 910. In addition, the position and size information 941–947 may be modified by dragging the blue character frame displayed in the window 910 with the pointing device.

Here, each attribute displayed in the window 930 is described. The character recognition field 931 and the image field 933 may be selected as a field not recognizing a character but only capturing an image or a field to which character recognition is actually applied.

A field name 935 is a name provided for this identified field. Visual check specification 937 is an item for determining whether or not the recognized character is output to the display screen of the OCR during character recognition with the OCR. Fonts being selected include three types of handwriting, stamp, and print, and the method for recognizing the character may be changed with this attribute to improve the recognition ratio.

Character types 961–973 indicate possible characters input in that field. Recognition levels 981–985 allows it to select whether a character with a high possibility of erroneous recognition is handled as a result for the time being or it is eliminated as an error. In addition, an output code is an entry to select whether the result of recognition is output in double byte code (DBCS) when it is output or in single byte code (SBCS).

However, the attribute information displayed here is a mere example, and may include necessity of knowledge processing. In such a case, '-' held between numerals in an address field may be determined as a hyphen (-) not a long sound (—) or one in Kanji (–). Various information associated with such a specific field fall within the "attribute information" set forth in the Claims.

Figure 9:
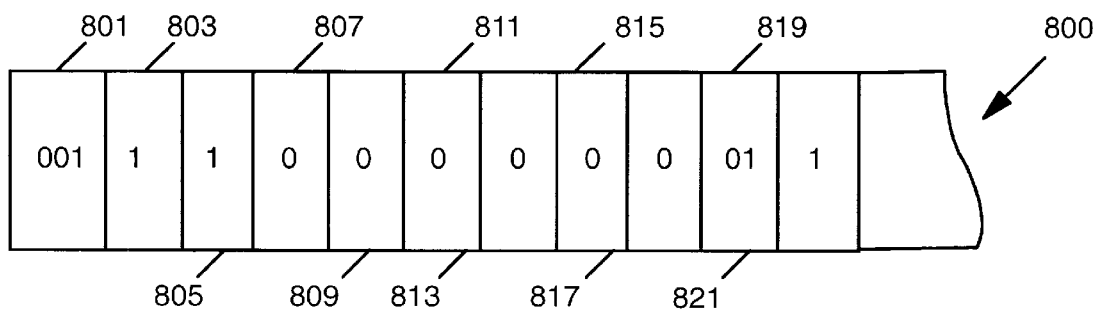
FIG. 9 is a diagram of attribute information stored in the field position/attribute information storage section 113 in accordance with the present invention.

When such attribute information is input or modified, and the OK button is clicked, attribute information 800 shown in FIG. 9 is created and stored in the field position/attribute information storage section 113. In the present invention, each attribute record is assigned with a serial number 801 corresponding to the field position information record 700. Items 803 through 821 are values corresponding to the attributes indicated in the window 930 of FIG. 10. However, if both records are created as one record, the serial number is not required. The present invention may be implemented by storing each attribute information in any format as long as it is associated with the position information of the field.

Now, a description is given on a method for recognizing other quadrilateral objects such as a page mark and a position correction mark in accordance with the present invention. Referring to FIG. 5 again, when the surrounding is determined not to be white in block 403, the image recognition system 100 determines that a page mark or position correction mark is clicked by the operator. As described above, it may be arranged that a predetermined condition is processed as an input error and the operator is prompted for input again.

Then, as in the detection of a character frame, scanning is performed in the vertical and horizontal directions to detect the height and width of a black rectangle in addition to the position information. In the case of an OCR form currently available in the market as an example, the size of page marks 201 and 203 is rated to be designed to be 6.0 mm–10.0 mm wide, and 1.0 mm–6.0 mm high for that form. Therefore, preferably the size of a thin rectangle for producing a histogram is established to be slightly larger than 20.0 mm (twice the maximum width of 10.0 mm) for a lateral rectangle, and slightly larger than 12.0 mm (twice the maximum height of 6.0 mm) for a longitudinal rectangle. Here, the reason why it is made slightly larger is because even any point in a 6.0 mm frame is clicked the frame is surely included in a size larger than 12.0 mm (±6.0 mm). Since the page mark is within 40.0 mm from the top of the form and there is no position correction mark in this region, they can be distinguished by the y coordinate value of a point clicked by the operator. Other features of the form, such as size can be utilized for the distinction between page marks and position correction marks (block 423).

On the other hand, the size of position correction marks 211–217 and 221–227 is rated to be designed to be 3.0 mm–10.0 mm on the axis of abscissa (horizontal direction in the figure), and 1.0 mm in the height for the OCR form described above. Therefore the size of the rectangle is preferably slightly larger than 20.0 mm (twice the maximum width of 10.0 mm) for a lateral rectangle, and larger than 2.0 mm (twice the maximum height of 1.0 mm) for a longitudinal rectangle.

In the present invention, also for the page mark or position correction mark as in the character frame, a histogram is produced by vertically and horizontally scanning rectangles around a clicked point (first input point). For the page mark or position correction mark also, in the present invention, a threshold is provided to eliminate noise. For example, when 90% of the width of the rectangle is detected to be "white," it is determined that they are pixels constituting the background. Such scanning enables it to obtain x and y coordinates for each side of a page mark or position correction mark (a position which is first determined to be the outermost pixel or the pixel of the "background" adjacent to the page mark or position correction mark) and to obtain position information of the quadrilateral object constituting the page mark or position correction mark.

Since the position correction mark has a height of about 1.0 mm, it is hard for the operator to click. Thus, when a character frame fails to be detected in the character frame at the left end in block 405 of FIG. 5, the detection of the position correction mark is again performed by jumping to block 427. In this case, the longitudinal rectangle for producing the histogram is established to be slightly larger than 6.0 mm (when considering that an input error by the operator is 2.0 mm) instead of the length of 2.0 mm. Then, a block of black points with a height of about 0.9 mm (about 90% of the height of 1.0 mm) is recognized as the position correction mark. Then, if the detection of the page mark fails, and if the detection of the position correction mark fails, a display or sound indicating input error is output to the operator for re-input.

In the present invention, a quadrilateral object is defined by calculating its width from two x coordinate values obtained by horizontal scanning of the quadrilateral object, calculating its height from two y coordinate values obtained by vertical scanning, calculating the coordinates of the start point as in the character frame and holding these values.

However, there are various methods for defining a quadrilateral object. For example, it may be defined by using any one of four vortexes of the quadrilateral object, by either one of height or width and the x or y coordinate of two vortexes, or holding the coordinate values of four vortexes. All of them are included in the spirit of the present invention.

In addition, the above-mentioned method for scanning a predetermined width is to eliminate the effect of noise by establishing a threshold slightly smaller than the smaller width of the rectangle (80–90%). The present invention may be implemented by scanning pixels on a rectilinear line although it may be affected by noise. The definition information is returned back from the image analyzer 105 to the control section 103 and stored in the field position/attribute information storage section 113 together with the type of the page mark or position correction mark.

In the case of a dropout form, it is desirable that a page mark or position correction mark exists (the mark may be omitted by using an edge of the form if it can be detected in the case that the outside of the form is black in image), which can be detected and defined by the above method. In addition, when three or more position correction marks exist along one side of the form with equal spacing, all marks can be defined by clicking the top and bottom position correction marks with a method similar to the method for detecting a plurality of frames shown in FIG. 8 (a histogram is produced by vertically scanning a plurality of position correction marks).

In addition, conversion may be applied to correct skew in the input image data by, prior to the detection of character frame, detecting the page mark to calculate skew of the entire form image. The processing speed can be improved by setting the y coordinate of the right frame to a value equal to that of the left frame with such process. In addition, scanning may be performed in a first direction of scan in the direction corrected based on the calculated value of skew (substantially vertical or horizontal direction of the input form image) and in a second direction of scan (substantially horizontal or vertical direction of the input form image).

As described above, according to the present invention, a quadrilateral object such as a character frame, page mark or position correction mark can be automatically determined only with a mouse click. In addition, the present invention can provide an image processing system with a simple user interface and operate at a high speed. In addition, one aspect of the present invention can provide a character recognition processing system which is robust to accommodate inclination in scanning, improper adjustment of density, or blurring of black frame by noise in defining a form for OCR. Another aspect of the present invention provides a character recognition processing system which can easily and semi-automatically define a page mark and a position correction mark as well, and can easily define a dropout form.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A method for recognizing position information of a quadrilateral object contained in an input bitmap image comprising the steps of:

(a) identifying a first input point in the bitmap image;

(b) deriving position information of a first point and a second point by searching along a first rectilinear line passing through near said first input point the first and second points corresponding to a first pixel and a second pixel, respectively, said first and second pixels being pixels existing on said first rectilinear line, and having specific values, and existing in directions symmetric to said first input point, respectively;

(c) deriving position information of a third point and a fourth point by searching along a second rectilinear line which passes through near said first input point and is substantially perpendicular to said first rectilinear line, said third and fourth points corresponding to a third pixel and a fourth pixel, respectively, said third and fourth pixels being pixels existing on said second rectilinear line, and having specific values, and existing in directions symmetric to said first input point, respectively; and (d) deriving position information of said quadrilateral object from the position information of said first, second, third and fourth points.

2. The method of claim 1, wherein said method is further operative to recognize attribute information of a quadrilateral object contained in an input bitmap image, said method further comprising the steps of:

(d) receiving input of attribute information associated with said quadrilateral object; and (e) storing said input attribute information by associating it with the position information of said quadrilateral object.

3. The method of claim 1, further including an image processing apparatus including a display device and a pointing device for inputting position information on a display screen of said display device, said recognizing step including:

(i) displaying said bit map image together with said quadrilateral object on the display screen;

(ii) recognizing a first input point on said quadrilateral object is identified by said pointing device; and after step (d)

(e) changing the quadrilateral object displayed on said display screen to be recognizable based on the position information of said quadrilateral object and displaying it.

4. A method for recognizing position information of a plurality of quadrilateral objects contained in an input bitmap image based on information on a first input point and a second input point input by an operator comprising the steps of:

(a) identifying a first input point in said bitmap image;

(b) deriving position information of a first point and a second point by searching along a first rectilinear line passing through near said first input point, said first and second points corresponding to a first pixel and a second pixel, respectively, said first and second pixels being pixels existing on said first rectilinear line, and having specific values, and existing in directions symmetric to said first input point, respectively;

(c) deriving position information of a third point by searching along a second rectilinear line which passes through near said first input point and is substantially perpendicular to said first rectilinear line, said third point corresponding to a third pixel, said third pixel being a pixel existing on said second rectilinear line, and having a specific value, and existing in a direction symmetric to said second input point with respect to said first input point;

(d) deriving position information of a fourth point and a fifth point by searching said fourth and fifth points corresponding to a fourth pixel and a fifth pixel, respectively, said fourth pixel being a pixel existing on a rectilinear line passing through near said second input point and parallel to said second direction, and having a specific value, and existing between said first and second input points, said fifth pixel being a pixel existing on a rectilinear line substantially parallel to said second direction, and having a specific value, and existing in a direction symmetric to said first input point with respect to said second input point; and (e) deriving position information of said plurality of quadrilateral objects from the position information of said first, second, third, fourth and fifth points.

5. The method of claim 4, wherein said method is further operative to recognize attribute information of a plurality of quadrilateral objects contained in an input bitmap image based on information on a first input point and a second input point input by an operator, said method further comprising the steps of:

(f) receiving input of attribute information associated with said plurality of quadrilateral objects; and (g) associating and storing said input attribute information with said plurality of quadrilateral objects.

6. An apparatus including a display screen, and a pointing device for pointing a point on said display screen, and for recognizing position information of a quadrilateral object contained in a bitmap form image input from a scanner based on position information input from said pointing device, said apparatus comprising:

(a) an image input section for holding a bitmap form image;

(b) an image display section for displaying said bitmap form image on said display screen;

(c) an input section for identifying a first input point on the quadrilateral object;

(d) an image analyzer for:

(d1) deriving position information of a first point and a second point by searching along a first rectilinear line passing through near said first input point, the first and second points corresponding to a first pixel and a second pixel, respectively, said first and second pixels being pixels existing on said first rectilinear line, and having specific values, and existing in directions symmetric to said first input point, respectively, (d2) deriving position information of a third point and a fourth point by searching along a second rectilinear line which passes through near said first input point and is substantially perpendicular to said first rectilinear line, said third and fourth points corresponding to a third pixel and a fourth pixel, respectively, said third and fourth pixels being pixels existing on said second rectilinear line, and having specific values, and existing in directions symmetric to said first input point, respectively, and (d3) deriving position information of said quadrilateral object from the position information of said first, second, third and fourth points.

* * * * *